June 14, 1960 E. E. HOOD 2,940,339
SEMI-AUTOMATIC TWO-SPEED HUB FOR VELOCIPEDES AND THE LIKE
Filed Sept. 17, 1958 3 Sheets-Sheet 1

WITNESS:
Arthur M. Stockton

INVENTOR.
Edwin Elliott Hood
BY
Clinton S. Janes
ATTORNEY

June 14, 1960 E. E. HOOD 2,940,339
SEMI-AUTOMATIC TWO-SPEED HUB FOR VELOCIPEDES AND THE LIKE
Filed Sept. 17, 1958 3 Sheets-Sheet 2
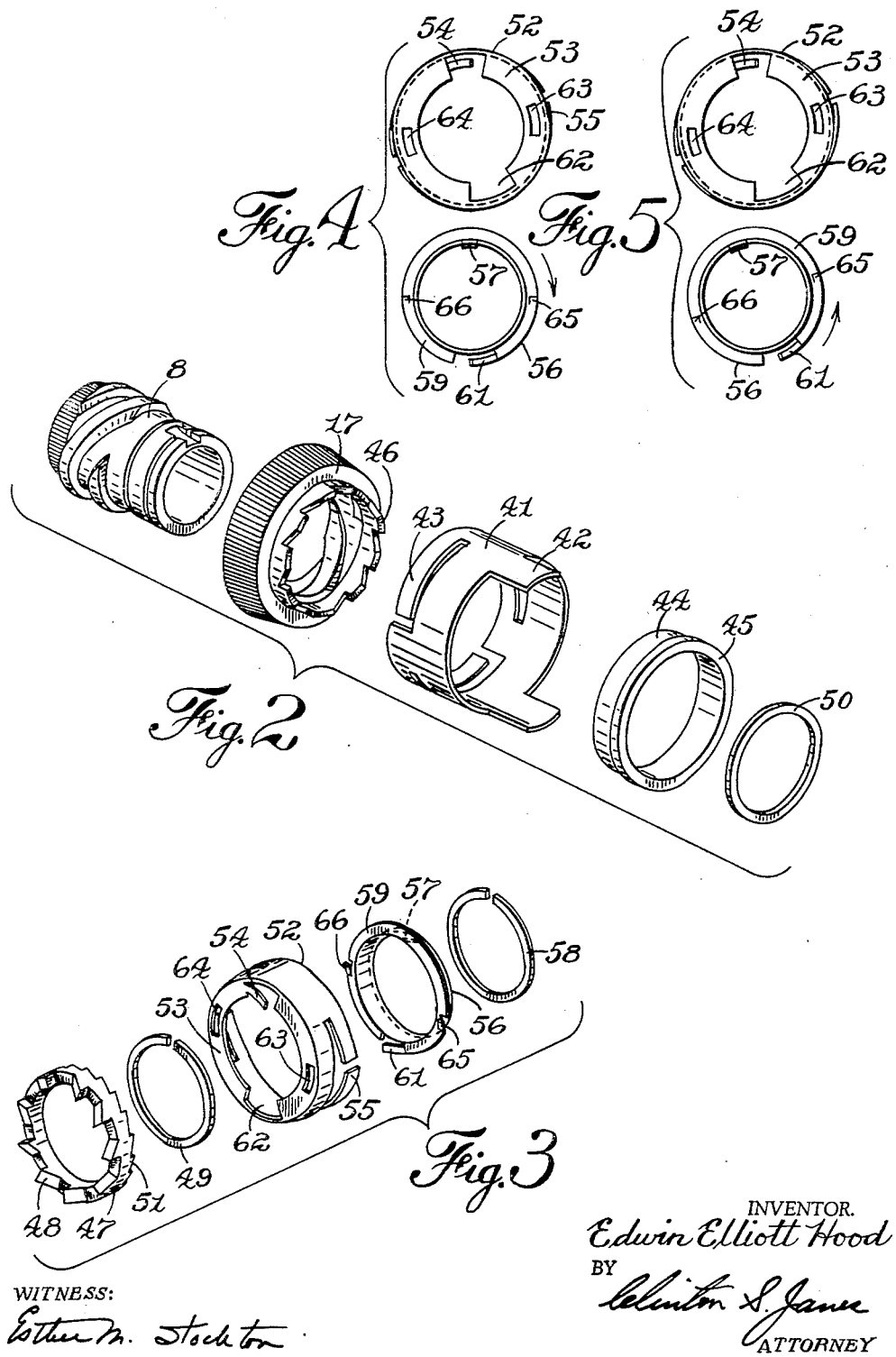
INVENTOR.
Edwin Elliott Hood
BY
Clinton S. James
ATTORNEY
WITNESS:
Esther M. Stockton United States Patent Office 2,940,339
Patented June 14, 1960

2,940,339

SEMI-AUTOMATIC TWO-SPEED HUB FOR VELOCIPEDES AND THE LIKE

Edwin Elliott Hood, Elmira, N.Y., assignor to Bendix Aviation Corporation, Elmira Heights, N.Y., a corporation of Delaware Filed Sept. 17, 1958, Ser. No. 761,619

12 Claims. (Cl. 74—750)

The present invention relates to a semi-automatic two-speed hub for velocipedes and the like and more particularly to a hub having speed reducing gearing which is brought into and out of operation by a slight back pedaling movement.

It is an object of the present invention to provide a novel two-speed gear drive of the above type which is efficient and reliable in operation while being simple and economical in construction.

It is another object to provide such a device incorporating self-energizing high speed and low speed clutches and new and improved means for selectively rendering such clutches effective.

Further objects and advantages will be apparent from the following description taken in connection with the accompanying drawing in which:

Fig. 2 is an exploded view in perspective of the high speed screw shaft, clutch nut and retarder;

Fig. 3 is an exploded view in perspective of the selector ring, the detent cup, and indexing pawl thimble;

Fig. 4 is a detail in side elevation showing the relationship of the pawl and detent members during forward propulsion of the vehicle;

Fig. 5 is a view similar to Fig. 4 showing the relative positions of the pawl and detent members after back pedaling has taken place.

Figure 1:
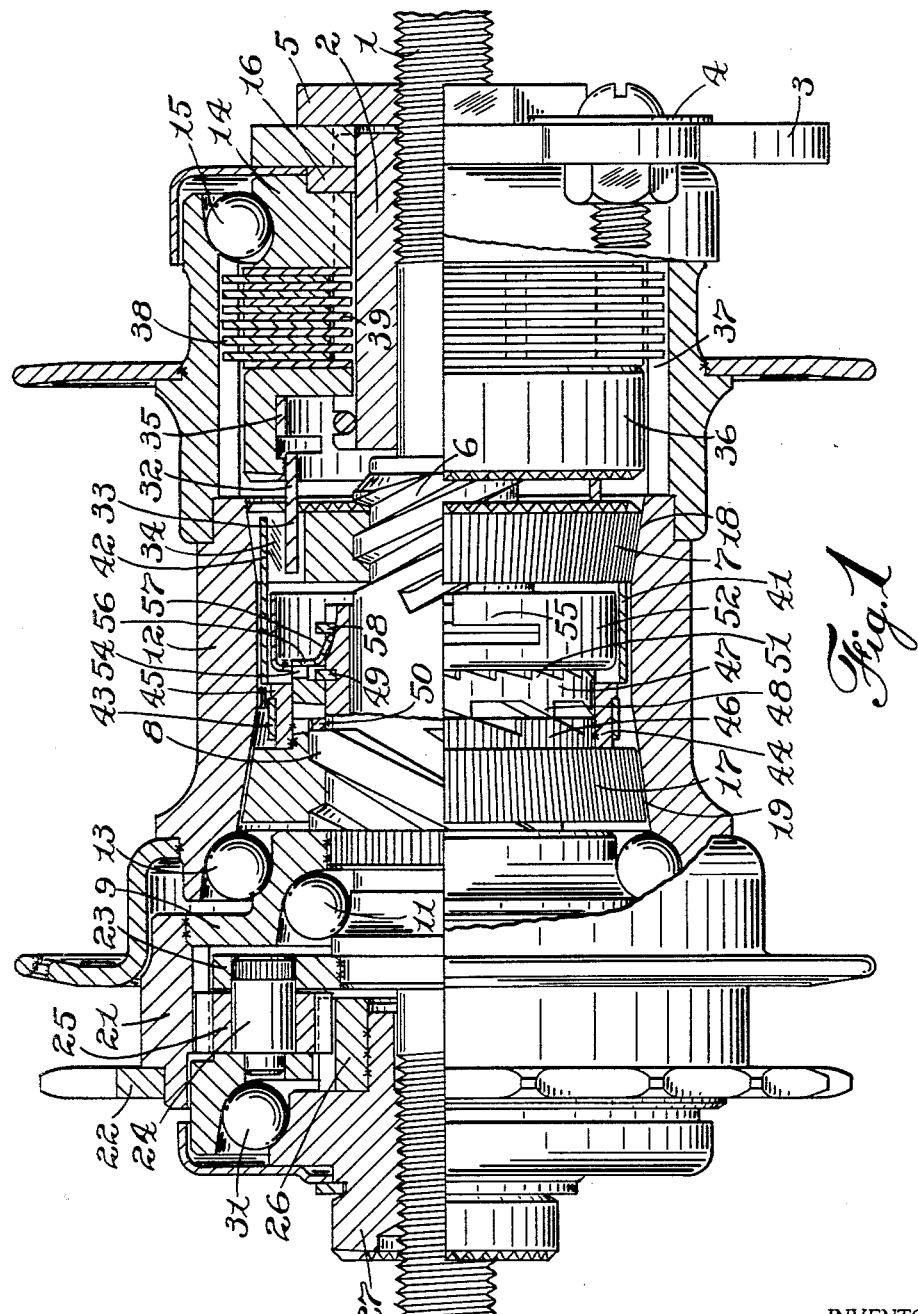
Fig. 1 is a side elevation partly broken away and in section of a preferred embodiment of the invention showing the parts in the positions assumed in driving through the low gear transmission.
Figure 6:
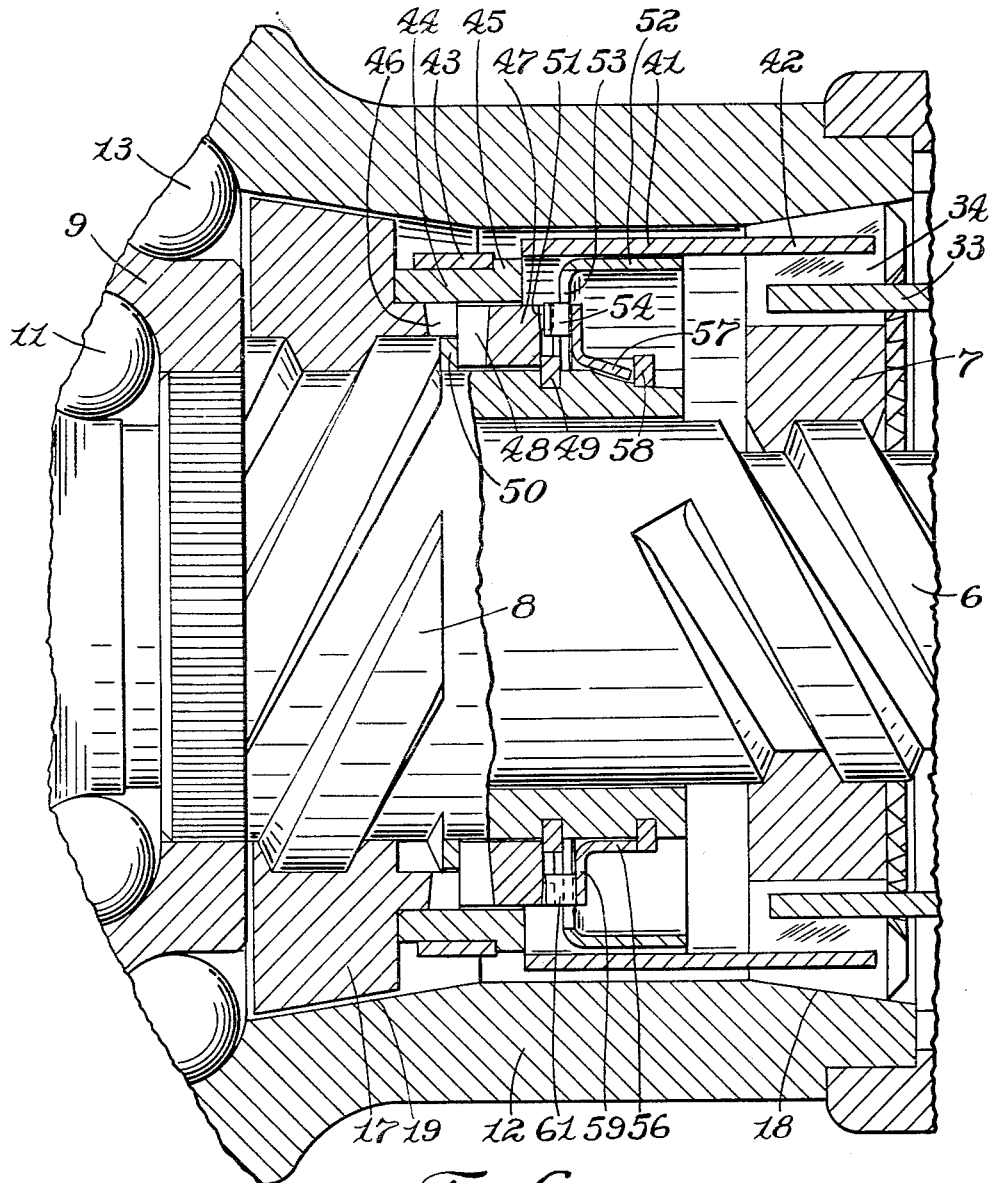
Fig. 6 is an enlarged detail, partly in elevation and partly in axial section, of the two clutch drives and the means for selecting the desired operative connection.

In Fig. 1 of the drawing there is illustrated a fixed axle 1 on which an anchor member 2 is threaded and prevented from rotation by an anchor arm 3 non-rotatably mounted thereon and arranged to be connected to a member such as the rear fork of a bicycle by means of a clip 4 in the usual manner for devices of this type. The anchor arm 3 is fitted on a non-circular projection of the anchor member 2 and retained thereon by a lock nut 5.

A low speed screw shaft 6 is journalled on the axle 1 and has threaded thereon a low speed clutch nut and brake actuating member 7. A high speed screw shaft 8 is rotatably mounted on the low speed screw shaft 6 and has fixed thereon a bearing member 9 supported by means of bearing 11 on the low speed screw shaft 6. A wheel hub 12 is rotatably mounted on the bearing member 9 by means of bearing 13, and on an abutment ring 14 splined on the anchor member 3, by means of bearing 15. Longitudinal movement of the abutment ring 14 to the right is prevent by a split thrust ring 16 seated in a peripheral groove in the anchor member adjacent the seat of the anchor arm 3.

A high speed clutch nut 17 is threaded on the high speed screw shaft 8. Clutch nuts 7 and 17 are provided with opposed frusto-conical surfaces arranged to be brought into and out of operative engagement with corresponding outwardly facing surfaces 18 and 19 in the interior of the hub 12.

A driving member in the form of an orbit gear 21 is rigidly mounted on the bearing member 9 and has fixed thereon in any suitable manner a sprocket 22 to be actuated by a chain transmission in the usual manner. A planet carrier cage 23 is fixedly mounted on the end of the low speed screw shaft 6 and has fixed therein a plurality of bearing pins 24 on which planet gears 25 are rotatably mounted in position to mesh with the orbit gear 21 and with a sun gear 26 fixedly mounted on a stationary bearing member 27 threaded on the axle 1. The outer end of the planet carrier 23 is rotatably supported on the stationary bearing member 27 by means of the bearing 31.

The high speed and low speed screw shafts are oppositely threaded in such manner that forward rotation thereof in the direction of the arrow (a) tends to thread the clutch nuts 7 and 17 toward each other into clutching engagement with the hub 12. Traversal of the low speed clutch nut 7 on rotation of the screw shaft 6 is ensured by means of a friction retarder 32 in the form of a sleeve having axially extending arms 33 slidably received in axial slots 34 in the periphery of the clutch nut 7, and having circumferentially extending arms 35 bearing frictionally in the interior of a thrust ring 36 splined on the anchor member 2.

The interior of the hub 12 is provided with splines 37, and a plurality of brake discs 38 and 39 are located between the abutment member 14 and the thrust ring 36, and splined alternately to the hub and anchor member respectively.

Means for insuring traversal of the high speed clutch nut 17 is provided comprising a high speed retarder sleeve 41 (Fig. 2) having axially extending arms 42 slidably received in the slots 34 of the low speed clutch nut 7 and having circumferentially extending arms 43 bearing frictionally on a flanged ring member 44 fixedly mounted on the high speed clutch nut 17. The flange 45 of the ring member 44 serves to retain the arms 43 on said ring, and thus forms a swivel connection between retarder sleeve 41 and the high speed clutch nut 17.

Means under the control of the operator are provided for optionally preventing engagement of the high speed clutch nut 17 with the hub 12 so as to permit the clutch nut 7 to engage and drive the hub in low gear. For this purpose the high speed clutch nut is formed with a plurality of laterially extending circumferentially spaced abutments 46 located within the ring 44, and a blocking or selector ring 47 having similarly spaced abutments 48 is journalled on a smooth reduced extension of the high speed screw shaft 8, being retained thereon by a lock ring 49, and spaced from the ends of the threads of said screw shaft by a thrust ring 50. The abutments 46, 48 are so formed than when they are in registry with each other, they prevent the high speed clutch nut 17 from engaging the hub, but when the selector ring is positioned to bring its abutments 48 into registry with the spaces between the opposing abutments 46, the high speed clutch nut 17 is free to engage and drive the hub at the same speed as the driving member 21.

Means are provided responsive to backward rotation of the driving member for indexing the selector ring 47 into and out of operative position. For this purpose, the selector ring is provided with a series of ratchet teeth 51, there being twice as many ratchet teeth as there are abutments 48 on said ring. A detent cup 52 is rotatably mounted in the high speed retarder sleeve 41 having an inwardly directed flange 53 abutting the selector ring 47 and a pawl 54 projecting therefrom into engagement with the teeth 51 on said ring.

The teeth 51 and pawl 54 are so directed as to prevent the selector ring 47 from rotating backwardly with respect to the detent cup. Said cup has a plurality of radially extending arms 55 bearing frictionally in the interior of the high speed retarder sleeve 41, whereby the detent cup is frictionally connected to the axle through the two retarder sleeves 41 and 32.

An indexing pawl thimble 56 is mounted on the end of the high speed screw shaft, being keyed thereto by a tongue 57 seated in a groove in the shaft, and retained thereon by a lock ring 58. As shown in Fig. 3, said thimble has a radial flange 59 forming a thrust bearing against the flange 53 of the detent cup 52, and a pawl 61 extending through an arcuate opening 62 in the flange 53 to engage the teeth 51 of the selector ring 47.

Means are provided for limiting the relative rotation between the indexing thimble 56 and the detent cup 52 to an arc slightly greater than one tooth 51 of the selector ring 47. For this purpose, the flange 53 of the detent cup 52 is provided with a pair of arcuate slots 63, 64, and the flange 59 of the indexing thimble has a pair of tongues 65, 66 struck up therefrom to enter said slots and thereby suitably restrict such relative rotation.

In operation, starting with the parts in the positions illustrated in Fig. 1, the abutments 46 on the high speed clutch member 17 are in registry with the abutments 48 on the selector ring 47, thus preventing engagement of the high speed clutch. Forward rotation of the driving member 21 in the direction of the arrow (a) causes the low speed screw shaft 6 to rotate and advance its clutch member 7 into engagement with the hub 12 which is consequently rotated forwardly at reduced speed. Cessation of rotation of the driving member 21 in coasting causes the hub 12 to overrun the low speed clutch member 7 and rotate freely without change in the transmission.

When it is desired to operate in high speed or direct drive, the operator back-pedals slightly, thus rotating the screw shafts 8 and 6 backward, causing their clutch nuts 17 and 7 to back away from the corresponding clutch surfaces 19, 18 of the hub. During this backward rotation of the high speed screw shaft 8 the indexing pawl thimble 56 which is keyed thereon also rotates backward. The detent cup 52, however, is prevented from such rotation by its frictional connection with the high speed retarder sleeve 41, which is coupled to the low speed retarder 32 by the common engagement of their overlapping axial arms 42, 33 in the slots 34 of the low speed clutch nut, while rotation of the low speed retarder 32 is resisted by the frictional engagement of its arm 35 in the non-rotatable thrust ring 36. The selector ring 47 is also prevented from rotation by engagement of the pawl 54 of the detent cup 52 with a tooth 51 of the selector ring consequently the pawl 61 of the indexing thimble 56 clicks over one tooth 51 of the selector ring.

The relationship of the indexing thimble and detent cup is best illustrated in Figs. 4 and 5 of the drawing. Fig. 4 shows these elements in their relative positions during forward rotation of the transmission, with the tongue 66 of the indexing thimble engaging the forward end of the slot 64 of the detent cup to cause rotation of the detent cup with the indexing thimble in forward direction, and pawl 61 extending through the opening 62 in the detent cup in order to engage a tooth 51 of the selector ring 47. Fig. 5 shows the positions of the parts after the backward rotation of the indexing thimble, with its finger 65 engaging the rearward end of the opening 63 in the detent cup 52 whereby any further backward rotation of the indexing thimble will be transmitted positively to the detent cup.

A resumption of forward rotation of the transmission will cause the indexing thimble to rotate the selector ring 47 with it by means of the pawl 61, while the high speed clutch member 17 is held stationary by means of its frictional engagement with the high speed retarder spring 41. This indexes the selector ring 47 to bring its abutments 48 into registry with the spaces 50 between the abutments 46 of the high speed clutch member 17 whereby the latter is now free to be traversed by the screw shaft 8 into engagement with the hub 12 which is thereupon rotated forward at the same speed as the driving member 21.

It will be understood that the frictional drag between the low speed retarder spring 32 and the thrust ring 36 will be greater than the frictional connection between the high speed retarder spring 41 and either the high speed clutch member 17 or the detent cup 52. However, the relationship between these two latter frictional connections is immaterial.

Although but one form of the invention has been shown and described in detail it will be understood that changes may be made in the design and arrangement of the parts without departing from the spirit of the invention.

I claim:

1. In a two-speed gear drive and coaster brake for velocipedes or the like, a fixed axle, an anchor member fixedly mounted thereon, a low speed screw shaft journalled on the axle, a high speed screw shaft and driving member rotatably mounted on the low speed shaft, reduction gearing connecting the high speed shaft to the low speed shaft, a hub rotatably mounted on the anchor member and high speed screw shaft, a low speed clutch nut threaded on the low speed screw shaft for movement into and out of clutching engagement with the hub, a high speed clutch nut threaded on the high speed screw shaft for movement into and out of clutching engagement with the hub, a frictional connection from the low speed clutch nut to the axle to ensure the traversal of the low speed clutch nut upon rotation of its screw shaft, means including a rotary selector member movable into and out of position to block the travel of the high speed clutch nut and thus prevent it from making driving engagement with the hub, and means for indexing the selector member for rendering it alternatively operative or inoperative including a pawl member fixed on the high speed screw shaft, a member connected positively to rotate with the low speed clutch nut, and a detent member frictionally connected directly to said last-mentioned member having means opposing backward rotation of the selector member.

2. A two-speed gear and brake as set forth in claim 1 in which said screw shafts are of opposite hand, and the clutch nuts are formed with opposed frusto-conical peripheral surfaces adapted to engage corresponding outwardly-facing surfaces on the interior of the hub.

3. A device as set forth in claim 1 in which said member connected to rotate with the low speed clutch nut is in the form of a high speed clutch nut retarder having a frictional connection with the high speed clutch nut.

4. A device as set forth in claim 3 in which the high speed clutch nut retarder is in the form of a sleeve having a splined connection with the low speed clutch nut, and having an arm bearing frictionally on the high speed clutch nut; and the detent member is in the form of a cup rotatably mounted in said sleeve with an arm bearing frictionally on the inner surface of the sleeve.

5. A device as set forth in claim 4 in which said blocking means for the high speed clutch nut comprises a selector ring having a number of equally spaced projections on one side adapted to be brought into and out of blocking engagement with similar spaced lateral projections of the high speed clutch nut, and having double the number of ratchet teeth on the other side engaged by the indexing pawl.

6. A device as set forth in claim 5 in which the detent member is provided with a pawl engaging the teeth of the selector ring, and including further a lost motion connection between the indexing pawl member and the detent member limiting relative rotation therebetween to approximately the equivalent of one tooth of the selector ring.

7. A device as set forth in claim 5 in which the detent cup is formed with a flange bearing against the selector ring and the indexing pawl member is in the form of a thimble having a radial flange forming a thrust bearing for the flange of the detent cup, said detent cup flange having an arcuate opening through which the indexing pawl extends to engage the teeth of the selector ring.

8. A two-speed hub transmission for velocipedes comprising a stationary axle; a hub rotatably mounted relative to the axle; a direct drive for the hub including an automatically engaging high speed clutch member, a reduction gear drive including a low speed automatically engaging clutch member, and means under the control of the operator for preventing engagement of the high speed clutch including a selector ring rotatable into and out of operative relation to the high speed clutch member, and means for indexing the selector ring comprising a single direct frictional connection from the selector ring to the low speed clutch member and a second frictional connection from the low speed clutch member to the axle, said second frictional connection being arranged to transmit substantially greater torque than the first mentioned frictional connection.

9. In a two-speed gear drive and coaster brake for velocipedes or the like a fixed axle, a first screw shaft journalled on the axle, a second screw shaft rotatably mounted on said first screw shaft and of opposite hand, a hub rotatably mounted relative to said screw shafts, means for rotating the hub including gearing connecting said screw shafts, a first clutch nut threaded on the first screw shaft, a second clutch nut threaded on the second screw shaft and having a plurality of equally spaced lateral projections on one face, means for providing a frictional connection between said clutch nuts and the axle to ensure the traversal of said clutch nuts into and out of driving engagement with the hub upon rotation of their respective screw shafts, blocking means journalled on said second screw shaft and movable into and out of position to block the traversal of one of said clutch nuts and thus prevent it from making driving engagement with the hub, indexing means including a member for indexing said blocking means and rendering it alternatively operative and inoperative, and a detent member frictionally connected directly to said frictional connecting means opposing backward rotation of said blocking means.

10. In the device set forth in claim 9 said blocking means comprising a rotary selector member having a number of equally spaced projections on one side adapted to be brought into and out of engagement with the lateral projections of said second clutch nut, and having double the number of ratchet teeth on another side engaged by the indexing member; further, said indexing member including a pawl member fixed with respect to said second screw shaft to provide the engagement with the ratchet teeth of the selector member.

11. In the device set forth in claim 9 the detent member comprising a cup shaped portion rotatably mounted in said frictional connecting means and means opposing backward rotation of the blocking means including a pawl engaging the blocking means, a lost motion connection between the indexing member and the detent member limiting relative rotation therebetween, a flange in the bottom of the cup portion bearing against the blocking means and thrustwise supported by the indexing member, said flange having arcuate openings through which a portion of the indexing member extends to engage the blocking means.

12. A two-speed hub transmission for velocipedes comprising a stationary axle; a hub rotatably mounted relative to the axle; a drive for the hub including an automatically engaging first clutch member, a variable-ratio gear drive including a second automatic hub engaging clutch member; means under the control of the operator for preventing engagement of one of said clutch members including a blocking member rotatable into and out of operative relation to said one clutch member; means for indexing the blocking member comprising a first direct frictional connection from the blocking member to the other said clutch member, and a second frictional connection from said other clutch member to the axle, said second frictional connection being arranged to transmit substantially greater torque than said first frictional connection.

References Cited in the file of this patent
UNITED STATES PATENTS 2,837,187   Hood _____ June 3, 1958